United States Patent [19]
Tatzel et al.

[11] 3,992,501
[45] Nov. 16, 1976

[54] PROCESS FOR THE MANUFACTURE OF VOID-FREE POLYOLEFIN FOAM MOLDINGS

[75] Inventors: Hermann Tatzel, Leutershausen; Wolfram Koegel, Mannheim; Gilbert Beck, Ludwigshafen; Ludwig Zuern, Bad Durkheim; Arndt Christian Caesar, Frankenthal, all of Germany

[73] Assignee: BASF Aktiengesellschaft, Ludwigshafen (Rhine), Germany

[22] Filed: June 18, 1974

[21] Appl. No.: 480,405

[30] Foreign Application Priority Data
June 20, 1973 Germany............................ 2331302

[52] U.S. Cl.............................. 264/126; 204/159.2; 260/2.5 B; 264/22; 264/53; 264/234; 264/DIG. 18; 425/812; 425/817 C
[51] Int. Cl.² ...................... B29D 27/00; B29F 5/02
[58] Field of Search................ 264/DIG. 18, DIG. 7, 264/101, 109, 234, 51; 260/2.5 B; 425/812, 817 C; 204/159.2

[56] References Cited
UNITED STATES PATENTS

| | | | |
|---|---|---|---|
| 3,655,542 | 4/1972 | Tamai et al................. | 264/DIG. 18 |
| 3,746,610 | 7/1973 | Hoegger........................... | 264/109 X |
| 3,832,429 | 8/1974 | Charpentier.................... | 264/109 X |
| 3,889,032 | 6/1975 | Koelsch .......................... | 264/126 X |

*Primary Examiner*—Philip Anderson
*Attorney, Agent, or Firm*—Johnston, Keil, Thompson & Shurtleff

[57] ABSTRACT

Foam moldings of olefin polymers are prepared by heating, and pressing together, foamed particles of an olefin polymer, containing crosslinked constituents, in molds, a temperature gradient of from 0.5° to 25° C per cm of loose mass of particles being established in the mold, which has a gas-permeable wall on the lower-temperature side.

2 Claims, 1 Drawing Figure

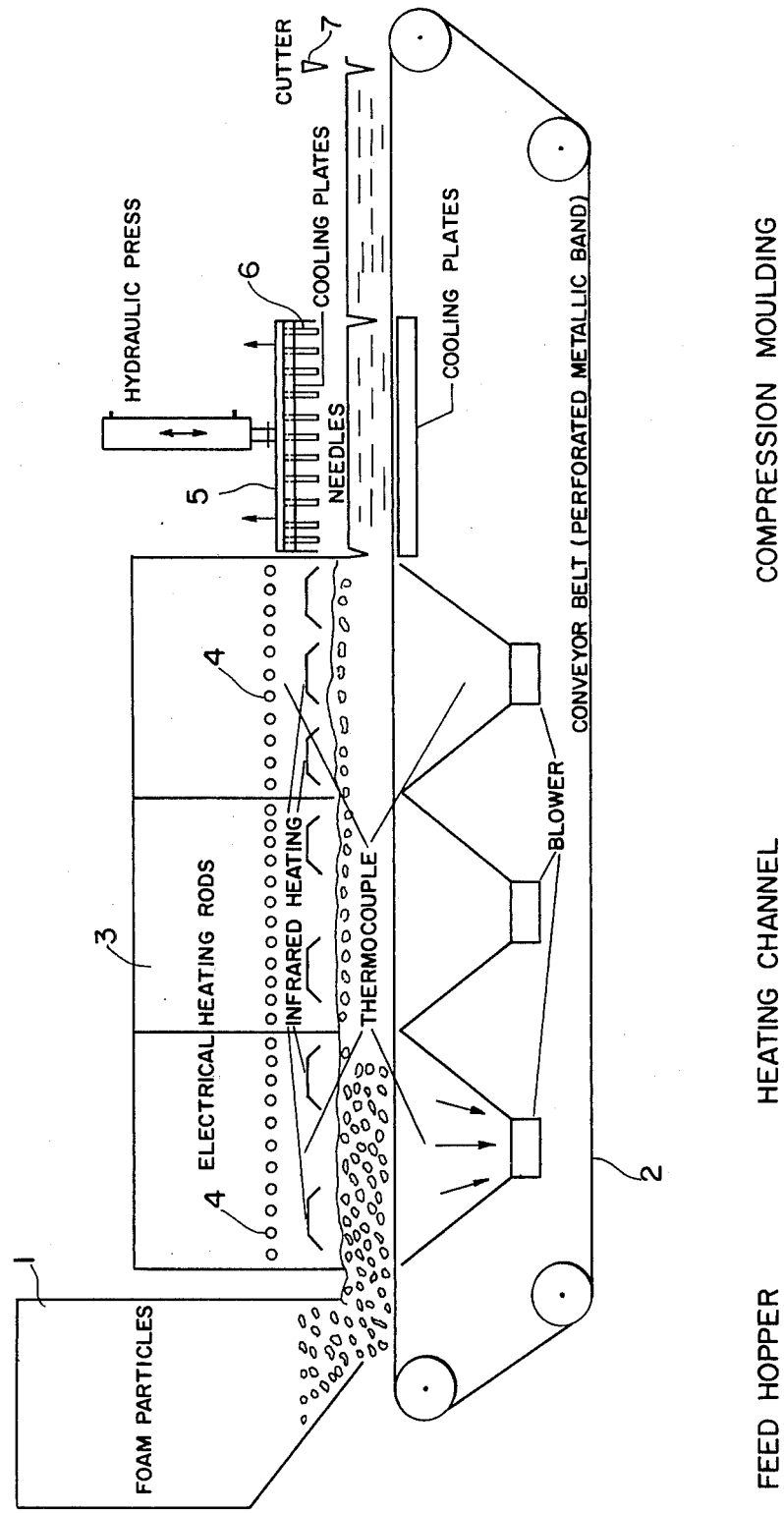

PROCESS FOR THE MANUFACTURE OF VOID-FREE POLYOLEFIN FOAM MOLDINGS

The invention relates to a process for the manufacture of foam moldings from olefin polymers by heating and pressing together foamed crosslinked particles of an olefin polymer in molds which are not gas-tight when closed.

German Printed Specification 1,629,281 discloses a method of heating foamed crosslinked particles of an olefin polymer in molds which are not gas-tight when closed to temperatures above the crystallite melting point of the olefin polymer and then compressing the particles in the mold by from 5 to 60% of the bulk volume. Flexible moldings of very low density, for example from 15 to 30 g/l, can be manufactured. The moldings have good surface characteristics and good mechanical properties but have the disadvantage that voids are present. The voids result from air being trapped, and compressed, between the particles when they are compressed in the mold. Because of the good sealant properties of the foam particles, the trapped air cannot escape.

It is an object of the invention to modify the above process in such a manner that the foam moldings obtained contain no voids.

According to the invention, this object is achieved by establishing a temperature gradient of 0.5° to 25° C per cm of the loose mass of particles in the mold, the mold having a gas-permeable wall on the lower-temperature side. In the preferred embodiment of the process according to the invention the air trapped in the loose mass is allowed to escape through a venting means during compression.

Suitable olefin polymers have an X-ray crystallinity of more than 20% by weight at a temperature of 25° C. Preferably, ethylene polymers manufactured by the conventional high pressure process for the polymerization of ethylene are used, for example polyethylene of density from 0.918 to 0.935 g/cm$^3$ and copolymers of ethylene with other ethylenically unsaturated compounds. The ethylene copolymers contain at least 50% by weight of copolymerized ethylene. Examples of suitable comonomers are acrylic acid and methacrylic acid esters in which the ester component is derived from alcohols of 1 to 18 carbon atoms, vinyl esters of carboxylic acids of 2 to 12 carbon atoms, such as vinyl acetate and vinyl propionate, fumaric acid, itaconic acid, maleic acid and their esters, carbon monoxide, acrylic acid and methacrylic acid. The ethylene copolymers can also contain two or more copolymerized ethylenically unsaturated compounds and can be, for example, copolymers of ethylene, vinyl acetate and ethyl acrylate or copolymers of ethylene, acrylic acid and tert.-butyl acrylate. The melt index of the olefin polymers is from 0.1 to 200 g/10 minutes (190° C/2.16 kg).

Foamed particles of olefin polymers are known. They contain mainly closed cells. The foamed particles are manufactured by mixing an olefin polymer, or a mixture of several olefin polymers, with a volatile blowing agent in an extruder at temperatures above the crystallite melting point of the olefin polymer, then cooling the mixture to a temperature near the crystallite melting point of the polymer and extruding the expandable mixture through a perforated die. This causes the extrudate to foam up; it is then comminuted and completely foamed olefin polymer particles are obtained.

In the preferred embodiment of the process according to the invention, the completely foamed particles of olefin polymers are crosslinked by high energy radiation. This radiation is preferably an electron beam but can also be X-rays and cobalt radiation. The radiation dose is from 10 to 80, and preferably from 40 to 60, Mrad. After the irradiation, the completely foamed particles contain from 10 to 85, and preferably from 30 to 70, % by weight of crosslinked constituents. Crosslinked portion or gel content denotes the proportion by weight of the polymer which is insoluble in solvents at temperatures above the crystallite melting point of the polymer. In ethylene polymers, for example, the gel content is determined by heating the foamed particles in toluene to 100° C, filtering and drying the insoluble constituents.

However, it is also possible to use foamed crosslinked particles which are manufactured by heating a mixture of an olefin polymer, a blowing agent which gives off gas and a peroxide, and comminuting the foam. To foam the mixture, it is heated to temperatures above the decomposition point of the peroxide and of the blowing agent which gives off gas. Processes for the manufacture of such foams are known. The diameter of the completely foamed olefin polymer particles is from 1 to 35, and preferably from 3 to 20 mm. The bulk density of the particles is from 5 to 200, preferably from 10 to 60, g/l.

The particulate foamed olefin polymers can contain additives which are conventionally incorporated into olefin polymers, for example stabilizers, flameproofing agents, colorants, lubricants, fillers or other polymers, such as polyisobutylene, polybutadiene-1,3 or polyisoprene.

The foamed crosslinked particles of an olefin polymer are sintered together in molds which are not gas-tight when closed. It is preferred to use molds in which at least one wall is movable so that the contents of the mold can be compressed. It is also possible to use arrangements consisting of 4 conveyor belts so related to one another as to form a channel. The foamed crosslinked particles are introduced at one end of the channel and are heated and compressed, and issue at the other end of the channel in the form of a strip of foam. The conveyor belts are so arranged as to compress the particles. The conveyor belts can also be divided up into plates and thus constructed as link chains.

The foamed particles are compressed in the mold by from 40 to 80, preferably from 50 to 70%, of the original bulk volume.

The foamed crosslinked olefin polymer particles are heated in the molds which are not gas-tight when closed, to temperatures at which the particles sinter. A wide temperature range, for example from 95° to 250° C, can be used. Preferably, the foamed crosslinked olefin polymer particles are heated to temperatures from 105° to 180° C. The particles are heated in the mold in such a way as to establish a temperature gradient in the loose mass of particles. This is achieved by heating the opposite sides of the mold to different temperatures. The temperature gradient within the mold is so arranged that the lower temperature is on the side of the gas-permeable wall. At least this one wall should be gas-permeable. A perforated wall or a wall provided with slits are examples of what is to be understood by a gas-permeable wall. The openings in the mold wall are smaller in size than the diameter of the particular olefin polymer particles employed so that the foamed crosslinked particles cannot be forced out of the mold.

The drawing is a schematic representation of the subject process. In the process, foamed particles containing no blowing agent flow from feed hopper 1 to form a layer of a predetermined height. The loose mass of particles is transported in steps through heating channel 3 by means of a perforated conveyor belt 2. In the heating channel 3 hot air is deawn through the loose mass of particles. The infrared heaters and the additional electrical heating rods 4 arranded above the loose mass of particles produce a temperature gradient in said mass. After leaving the heating channel 3, the loose mass of particles is compressed by the hydraulic press 5 to about 50% of its original height. The press is preferably provided with venting needles 6 through which air trapped between the particles escapes. The venting needles are withdrawn by raising the platen of press 5. The compression-molded board is then cut by means of cutter 7.

In the preferred embodiment of the process according to the invention, venting means are in addition introduced into the loose mass of particles so that when the particles are compressed, trapped air can escape. After compression, the venting means are removed from the foam and this ensures that the foam structure is not damaged. The channels produced on withdrawing the venting means do not show because the foamed particles are compressed sufficiently that the channels are sealed and the particles sinter to one another in these positions also. Venting means are to be understood to mean probes or needles whih have an internal channel. The diameter of the needles or probes is at most 5 mm and is in general from 1 to 3 mm.

Examples of uses of the foams manufactured in accordance with the invention are insulation in the building industry, packaging applications and the upholstery field. The invention is explained in more detail with reference to the Examples which follow.

EXAMPLE 1

A metal mold of size 1.1×1.1×0.15 m, having a perforated bottom, is filled with 120 l of crosslinked particles of a polyethylene having a density of 0.918 g/cc, a melt index of 1.7 g/10 minutes and a gel content of 55%. The diameter of the foamed crosslinked polyethylene particles is 16 mm. The loose mass of particles is heated, in the mold, for 17 minutes in an oven. The oven is fitted with electrical heating elements which are adjusted so that the temperature of the foamed particles in the upper part of the mold is 162° C whilst at the bottom of the mold it is 118° C. This gives a temperature gradient of 3° C per cm of the loose mass of the particles.

The mold is then placed under a press and the loose mass of particles in the mold is immediately thereafter compressed by 50% of the original volume. After 2 minutes' cooling time, a foam sheet of density 28 g/l is taken out of the mold. Samples cut from the sheet show that there are no voids in the sheet.

EXAMPLE 2

Foamed crosslinked particles of a copolymer of 93% by weight of ethylene and 7% by weight of vinyl acetate, having a melt index of 8.5 g/10 minutes and a gel content of 45%, are heated, by means of an electrically heated oven, on a 35 cm wide belt installation. The foamed particles have a closed-cell structure and were crosslinked by the action of electron beams. The belt on which the foamed crosslinked particles are to be sintered is perforated. The loose mass of particles on the belt is heated by adjusting the temperature of the surface of the loose mass of particles to 157° C. The temperature of the foamed crosslinked particles which lie directly on the belt is 109° C. The temperature gradient is 3.9° C. A 55 mm thick foam sheet is manufactured in a press from a loose mass of particles, 120 mm high, by compressing the loose mass of particles by 55% of its original bulk volume. After a cooling time of 1.5 minutes in the press (the press ram then being cooled with water), a foam sheet of density 32 g/l is obtained.

EXAMPLE 3

A metal mold of size 1 × 1 × 0.20 m is filled to a height of 0.15 m with foamed crosslinked particles of polyethylene having a density of 0.918 g/cc, a melt index of 3.8 g/10 minutes and a gel content of 60% by weight. The average diameter of the foamed crosslinked polyethylene particles is 15 mm. The mold is heated in a heating oven so as to establish a temperature gradient of 2.5° C/cm in the mold, that is to say the temperature of the upper layer of the foamed particles is 145° C and the temperature of the foamed particles at the bottom of the mold is 108° C. The mold is then placed under a press. A total of 9 venting needles (external diameter 1 mm, venting channel diameter 0.3 mm), at a spacing of 20 cm between needles are introduced, through perforations in the bottom of the mold, into the loose mass of material to a depth of 25 mm. The loose mass of particles is then compressed by 60% of the original bulk volume. At the end of the pressing process, the venting needles are extracted from the foam sheet. The heat supplied suffices to weld together the channels left by the needles in the mass of material. The sheet is then cooled and released from the mold. A homogeneous polyethylene foam molding of density 35 g/l is obtained.

EXAMPLE 4

Foamed crosslinked particles of an ethylene copolymer which contains 15% by weight of copolymerized tert.-butyl acrylate and has a gel content of 65% by weight are heated to a temperature of 135° C on a belt installation in a heating oven. The temperature gradient is 10° C and the temperature of the foamed particles on the perforated belt is 125° C. A 200 mm high mass of particles is compressed by 50% of the original bulk volume in a cyclic press. Before compression, 4 venting needles, having an external diameter of 2 mm and an internal bore diameter of 0.5 mm, are introduced from the fixed bottom of the press into the loose mass of particles to a depth of 150 mm. During compression, these needles are evenly drawn out of the foam whilst maintaining a minimum distance of 10 mm between the tip of the needle and the press ram. A 100 mm thick foam sheet of density 31 g/l is obtained. Samples cut from the sheet contain no bubbles and show that the foamed crosslinked particles have welded together homogeneously.

We claim:

1. A process for the manufacture of void-free foam moldings from olefin polymers which comprises:
    differentially heating foamed cross-linked particles of an olefin polymer to the temperature at which they sinter or coalesce together in a mold which is not gas-tight when closed, said particles being heated in said mold so that a temperature gradient of 0.5° to 25° C per cm of the loose mass of particles is established in the mold which has a gas-permeable wall on the lower-temperature side;

compressing said heated particles having said temperature gradient in said mold to bond the particles together and form a void-free foam article;

cooling said compressed article and removing the foamed article from said mold.

2. A process as set forth in claim 1 wherein the air trapped in the loose mass of material is allowed to escape through elongated hollow members inserted into the loose mass during compression.

* * * * *